United States Patent
Wu et al.

(10) Patent No.: US 8,513,855 B2
(45) Date of Patent: Aug. 20, 2013

(54) CONTROL DEVICE FOR SUPPRESSION OF RESIDUAL VIBRATION OF PIEZOELECTRIC TRANSDUCER

(75) Inventors: Chao-Ting Wu, Taipei (TW); Wen-Jong Wu, Taipei (TW)

(73) Assignee: Tung Thih Electronic Co., Ltd., Taoyuan (TW)

( * ) Notice: Subject to any disclaimer, the term of this patent is extended or adjusted under 35 U.S.C. 154(b) by 315 days.

(21) Appl. No.: 13/067,028

(22) Filed: May 3, 2011

(65) Prior Publication Data

US 2012/0068574 A1 Mar. 22, 2012

(30) Foreign Application Priority Data

Sep. 17, 2010 (TW) ............................. 099131709 A

(51) Int. Cl.
*H01L 41/113* (2006.01)

(52) U.S. Cl.
USPC ................. 310/316.03; 310/316.01; 310/317; 310/318; 310/319

(58) Field of Classification Search
USPC ........................ 310/316.01, 316.03, 317–319
See application file for complete search history.

(56) References Cited

U.S. PATENT DOCUMENTS

| | | | | |
|---|---|---|---|---|
| 6,147,433 A | * | 11/2000 | Reineke et al. | 310/316.03 |
| 6,815,871 B2 | * | 11/2004 | Yuasa et al. | 310/317 |
| 6,995,496 B1 | * | 2/2006 | Hagood et al. | 310/317 |
| 7,538,473 B2 | * | 5/2009 | Blandino et al. | 310/317 |
| 2004/0152544 A1 | * | 8/2004 | Lammer | 473/520 |
| 2004/0226378 A1 | | 11/2004 | Oda | |
| 2006/0079354 A1 | * | 4/2006 | Lammer | 473/520 |

OTHER PUBLICATIONS

EP 11169625.8—Dec. 20, 2011 EPO Search Report.
Guyomar, Daniel et al., Energy Conversion Improvement in Ferroelectrics: Application to Energy Harvesting and Self-Powered Systems. Ultrasonics Symposium (IUS), IEEE International, Sep. 20, 2009, pp. 1-10.

* cited by examiner

*Primary Examiner* — Thomas Dougherty
(74) *Attorney, Agent, or Firm* — Davidson Berquist Jackson & Gowdey, LLP

(57) ABSTRACT

A control device for suppression of residual vibration of a piezoelectric transducer includes a capacitive energy storage component, and a switch unit. The control device is operable in a non-working mode, in which the switch unit provides voltage on the capacitive energy storage component to the piezoelectric transducer for reducing the residual vibration of the piezoelectric transducer. The capacitive energy storage component has a capacitance value that is sufficient for enabling the voltage on the capacitive energy storage component to substantially track voltage on the piezoelectric transducer under the non-working mode.

12 Claims, 7 Drawing Sheets

CONTROL DEVICE FOR SUPPRESSION OF RESIDUAL VIBRATION OF PIEZOELECTRIC TRANSDUCER

CROSS-REFERENCE TO RELATED APPLICATION

This application claims priority of Taiwanese Application No. 099131709, filed on Sep. 17, 2010.

BACKGROUND OF THE INVENTION

1. Field of the Invention

The present invention relates to a control device, more particularly to a control device for suppression of residual vibration of a piezoelectric transducer.

2. Description of the Related Art

A parking sensor is usually implemented by using aluminum shell stuck with a piezoelectric transducer. When a driving signal is transmitted to the parking sensor, the piezoelectric transducer will transform electrical energy into mechanical force due to piezoelectricity so as to cause the aluminum shell to vibrate for generating an ultrasonic wave signal. After the emission of the ultrasonic wave signal, the parking sensor will transfer into the sensing mode and keep sensing an echo signal which was generated by reflection of the ultrasonic wave signal when bumping into an obstacle. By calculation of the time difference between the moment when the ultrasonic wave emit and the moment when the parking sensor receive the echo signal, one could estimate the distance between the sensor and the obstacle. If a vehicle equipped with the parking sensor is about to bump into an obstacle, the parking sensor could sense the distance between the vehicle and the obstacle and start to notify the vehicle driver when the distance difference reaches a set value. The warning sound of the notification could be in a beeping rhythm that corresponds to the distance between the vehicle and the obstacle in order to let the driver know that he is getting closer to the obstacle. Nevertheless, after emission of the ultrasonic wave signal, the piezoelectric transducer and the aluminum shell could not stop vibrating right away due to their elasticity and the residual vibration will damp away as the energy being drained to overcome frictional or other resistive forces. A recovery time which the parking sensor needs to damp the residual vibration away forms a blind range in sensing obstacles. Obstacles in the blind range could not be sensed since the echo signal reflected by it reaches the parking sensor while it is still in the residual vibration and the parking sensor could not distinguish the echo signal from the residual vibration. Therefore, the residual mechanical vibration of the piezoelectric transducer must be suppressed to reduce a minimum distance that could be estimated by the parking sensor.

Referring to FIG. 1 and FIG. 2, a control device for suppression of residual vibration of a piezoelectric transducer 1 includes a driving circuit 2, a residual control circuit 3, and a switch circuit 4. The control device could be operated either in a working mode or in a non-working mode. Under the working mode, the switch circuit 4 couples the driving circuit 2 electrically to the piezoelectric transducer 1, and the driving circuit 2 outputs a sinusoidal electric current as a driving signal for driving the piezoelectric transducer 1 to vibrate. Under the non-working mode, the switch circuit 4 couples the residual control circuit 3 electrically to the piezoelectric transducer 1, and the residual control circuit 3 suppresses residual vibration of the piezoelectric transducer 1. During residual vibration of the piezoelectric transducer 1, the piezoelectric transducer 1 outputs an electric current due to piezoelectricity. The electric current remains sinusoidal, yet has relatively low amplitude.

A conventional residual control circuit 3' includes a direct current power source 31, and a switch unit 32. The direct current power source 31 supplies a direct current reference voltage. The switch unit 32 includes four switches 321 to 324. Under the non-working mode, when the electric current of the piezoelectric transducer 1 is positive (i.e., flow of the electric current from a first end of the piezoelectric transducer 1 toward a second end thereof, wherein the first end is connected to each of the switches 321, 322, and the second end is connected to each of the switches 323, 324), the switch unit 32 operates such that the switches 321, 323 conduct, and the direct current power source 31 provides a voltage equivalent to a positive direct current reference voltage for the piezoelectric transducer 1. When the electric current of the piezoelectric transducer 1 is negative (i.e., flow of the electric current from the second end of the piezoelectric transducer 1 toward the first end thereof), the switch unit 32 operates such that the switches 322, 324 conduct, and the direct current power source 31 provides a voltage equivalent to a negative direct current reference voltage for the piezoelectric transducer 1. In this way, the electric current outputted from the piezoelectric transducer 1 and the voltage applied thereto are in-phase, such that energy dissipation of the piezoelectric transducer 1 during each residual cycle is maximized for suppressing residual vibration of the piezoelectric transducer 1.

Even though the conventional residual control circuit 3' may indeed suppress residual vibration of the piezoelectric transducer 1 in an initial stage of the non-working mode, when residual vibration thereof has been reduced to a very small level, energy of the direct current power source 31 may disturb convergence of vibration of the piezoelectric transducer 1 through the switch unit 32, and may even cause the piezoelectric transducer 1 to vibrate once again.

Furthermore, in "Velocity-Controlled Piezoelectric Switching Energy Harvesting Device" by Y. P. Liu et al., International Conference on Renewable Energies and Power Quality (ICREPQ), April, 2009, an energy harvesting device which harvests energy from a piezoelectric transducer is disclosed. The energy harvesting device uses super (ultra) capacitors to store harvested energy.

SUMMARY OF THE INVENTION

Therefore, an object of the present invention is to provide a control device for suppression of residual vibration of a piezoelectric transducer that can ensure convergence of the residual vibration.

Accordingly, the control device for suppression of residual vibration of a piezoelectric transducer, which is applied in a system with an equivalent mass block, of this invention includes a capacitive energy storage component, and a switch unit. The switch unit is coupled electrically to the capacitive energy storage component, and is for coupling electrically to the piezoelectric transducer. The control device is operable in a non-working mode, in which the switch unit provides voltage on the capacitive energy storage component to the piezoelectric transducer for reducing the residual vibration of the piezoelectric transducer.

The capacitive energy storage component has a capacitance value that is large enough to make the voltage on the capacitive energy storage component to substantially follow the voltage on the piezoelectric transducer while the control device operates under the non-working mode.

The voltage on the capacitive energy storage component under the non-working mode satisfies the following inequality:

$$V_{DC} \le \frac{\pi}{4n} \frac{F_M}{\sin(\pi d)},$$

in which $V_{DC}$ represents the voltage on the capacitive energy storage component, n represents electro-mechanical ratio of the system, $F_M$ represents amplitude of an external force applied to the equivalent mass block at a resonant frequency, and d represents a duty cycle of the switch unit.

BRIEF DESCRIPTION OF THE DRAWINGS

Other features and advantages of the present invention will become apparent in the following detailed description of the two preferred embodiments with reference to the accompanying drawings, of which.

DETAILED DESCRIPTION OF THE PREFERRED EMBODIMENTS

Figure 1:
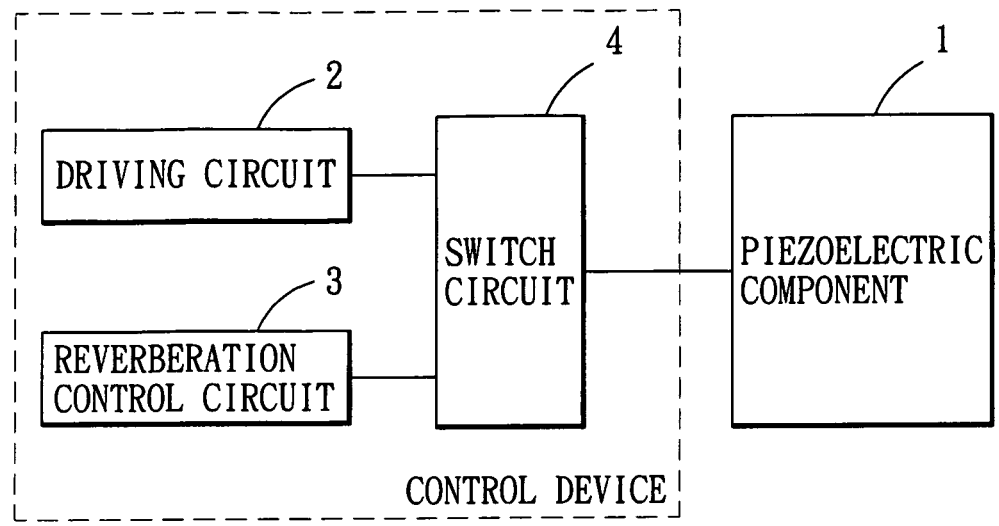
FIG. 1 is a block diagram illustrating a control device for suppression of residual vibration of a piezoelectric transducer.
Figure 3:
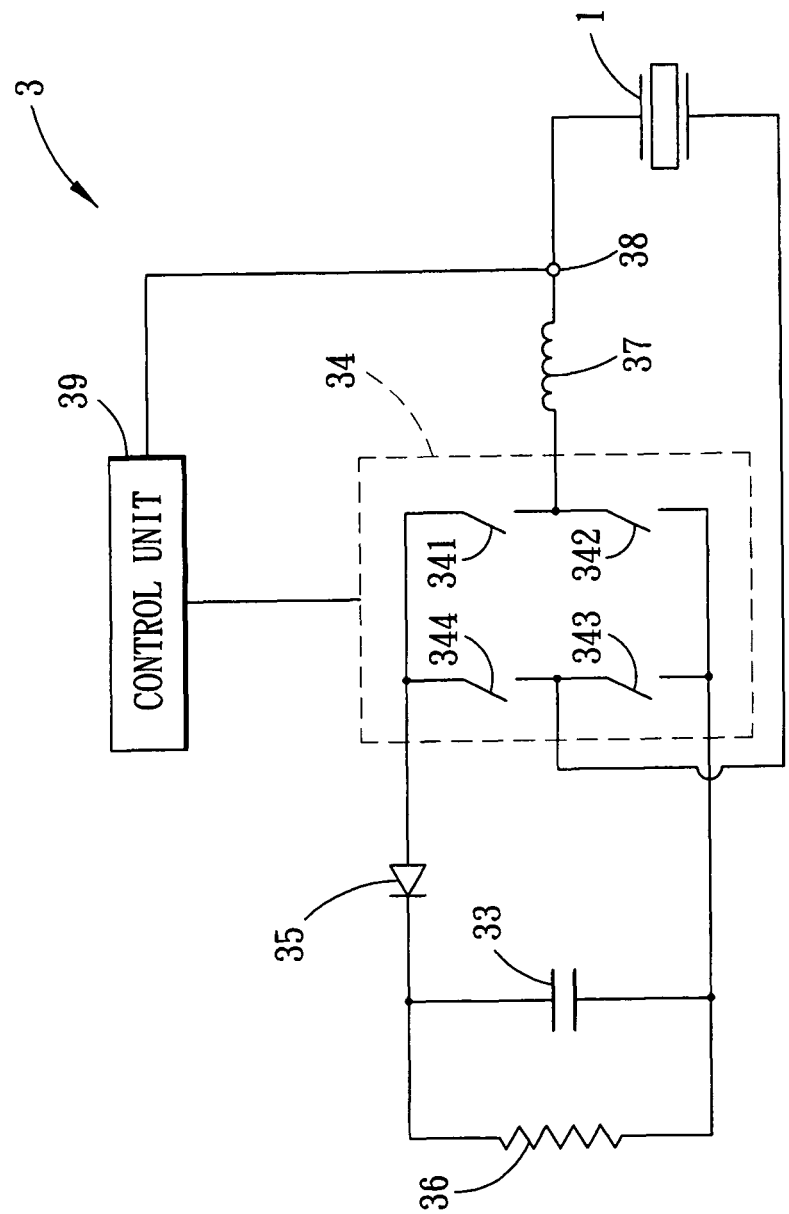
FIG. 3 is a circuit diagram illustrating a residual control circuit of a first preferred embodiment of a control device for suppression of residual vibration of a piezoelectric transducer of the present invention under a non-working mode.

Referring to FIG. 1 and FIG. 3, a first preferred embodiment of a control device for suppression of residual vibration of a piezoelectric transducer of the present invention includes a driving circuit 2, a residual control circuit 3, and a switch circuit 4. The control device is operable in a working mode and a non-working mode. Under the working mode, the switch circuit 4 couples the driving circuit 2 electrically to a piezoelectric transducer 1 and the driving circuit 2 outputs a sinusoidal electric current as a driving signal for driving the piezoelectric transducer 1 to vibrate. Under the non-working mode, the switch circuit 4 couples the residual control circuit 3 electrically to the piezoelectric transducer 1, and the residual control circuit 3 suppresses residual vibration of the piezoelectric transducer 1. During residual vibration of the piezoelectric transducer 1, the piezoelectric transducer 1 outputs an electric current due to piezoelectricity. The electric current remains sinusoidal, yet has relatively low amplitude.

The piezoelectric transducer 1 has a first component end and a second component end. The residual control circuit 3 includes a capacitive energy storage component 33, a switch unit 34, a diode 35, a resistor 36, an inductor 37, a current sensor 38, and a control unit 39. The capacitive energy storage component 33 has a third component end and a fourth component end. In this embodiment, the capacitive energy storage component 33 is a capacitor. Under the non-working mode, the switch unit 34 includes a first switch 341 connected between the first and third component ends, a second switch 342 connected between the first and fourth component ends, a third switch 343 connected between the second and fourth component ends, and a fourth switch 344 connected between the second and third component ends. The diode 35 has a cathode coupled electrically to the capacitive energy storage component 33, and an anode coupled electrically to each of the first and fourth switches 341, 344. In other words, the diode 35 may establish a current path from each of the first and fourth switches 341, 344 to the third component end of the capacitive energy storage component 33. The resistor 36 is connected in parallel with the capacitive energy storage component 33. The inductor 37 is coupled electrically between the piezoelectric transducer 1 and each of the first and second switches 341, 342. The current sensor 38 is coupled electrically between the inductor 37 and the piezoelectric transducer 1 for detecting direction of current flow through the piezoelectric transducer 1. The control unit 39 is coupled electrically to the switch unit 34 and the current sensor 38.

Figure 4:
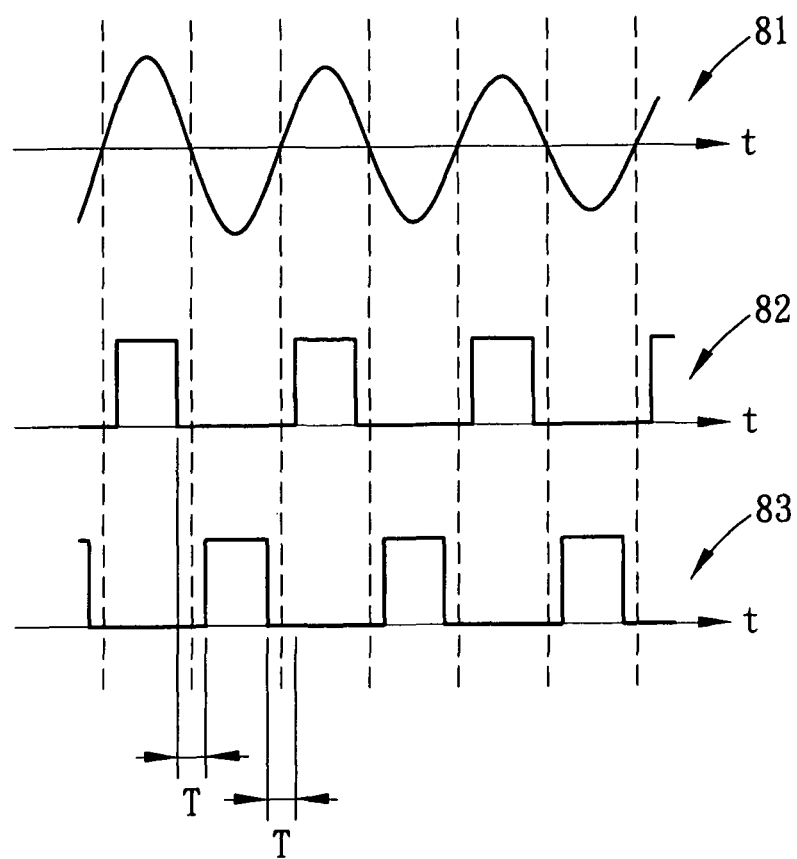
FIG. 4 is a waveform plot illustrating an electric current of the piezoelectric transducer and states of a switch unit of the first preferred embodiment.

Referring to FIG. 3 and FIG. 4, in FIG. 4, a waveform 81 illustrates an electric current of the piezoelectric transducer 1, a waveform 82 illustrates states of the first and third switches 341, 343, and a waveform 83 illustrates states of the second and fourth switches 342, 344. In the waveforms 82, 83, a high level represents a conducting state of the switches 341 to 344, and a low level represents a non-conducting state thereof. Under the non-working mode, the current sensor detects direction of current flow through the piezoelectric transducer 1. The control unit 39 is operable in the non-working mode to control the first and third switches 341, 343 to conduct when the current sensor 38 detects current flow through the piezoelectric transducer 1 to be positive, i.e., from the first component end toward the second component end, and to control the second and fourth switches 342, 344 to conduct when the current sensor 38 detects current flow through the piezoelectric transducer 1 to be negative, i.e., from the second component end toward the first component end. Therefore, the switch unit 34 is controlled to operate (i.e., the first and second switches 341, 342 conduct alternately, the third and fourth switches 343, 344 conduct alternately, and that the first and third switches 341, 343 conduct simultaneously), such that the capacitive energy storage component 33 is charged by energy released by the piezoelectric transducer 1. Furthermore, when a voltage on the piezoelectric transducer 1 is positive (i.e., in phase with the positive current flow through the piezoelectric transducer 1), the capacitive energy storage component 33 provides an equivalent positive voltage for the piezoelectric transducer 1, and when the voltage on the piezoelectric transducer 1 is negative (i.e., in phase with the negative current flow through the piezoelectric transducer 1), the capacitive energy storage component 33 provides an equivalent negative voltage for the piezoelectric transducer 1 so as to suppress residual vibration of the piezoelectric transducer 1.

Preferably, under the non-working mode, the second switch 342 conducts a predetermined time interval T (T being enlarged in FIG. 4 for ease of understanding) after the first switch 341 has stopped conducting and the third switch 343 conducts the predetermined time interval T after the second switch 342 has stopped conducting to enable the inductor 37 to release energy for charging the piezoelectric transducer 1. In this way, switching loss of the switch unit 34 is reduced.

Figure 5:
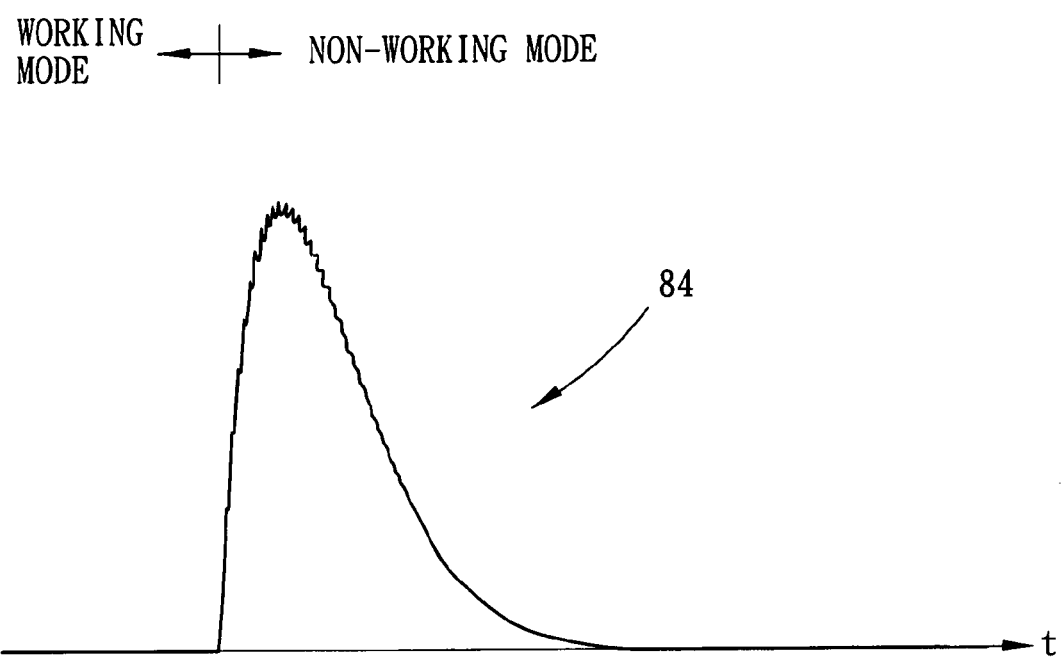
FIG. 5 is a waveform plot illustrating voltage on a capacitive energy storage component of the first preferred embodiment.

Referring to FIG. 3 and FIG. 5, a waveform 84 illustrates the voltage on the capacitive energy storage component 33. Noticeably, the residual control circuit 3 differs from an energy harvesting device, which is capable of harvesting energy from a piezoelectric transducer, and which is disclosed in "Velocity-Controlled Piezoelectric Switching Energy Harvesting Device" by Y. P. Liu et al., ICREPQ, April, 2009. The differences reside in that the capacitive energy storage component 33 of the residual control circuit 3 has a capacitance value that is sufficient for enabling the voltage on the capacitive energy storage component 33 to substantially track the voltage on the piezoelectric transducer 1 under the non-working mode so that the capacitive energy storage component 33 is charged by energy released by the piezoelectric transducer 1 and that the resistor 36 serves as a discharge path for energy released by the capacitive energy storage component 33. The voltage on the piezoelectric transducer 1 under the non-working mode varies due to amplitude variations of the residual vibration thereof. In other words, the higher the amplitude of the residual vibration of the piezoelectric transducer 1, the more energy the capacitive energy storage component 33 may harvest, and the voltage on the capacitive energy storage component 33 is higher. On the contrary, the lower the amplitude of the residual vibration of the piezoelectric transducer 1, the less energy the capacitive energy storage component 33 may harvest, and the voltage on the capacitive energy storage component 33 is lower. Furthermore, the voltage on the capacitive energy storage component 33 is substantially reduced to zero after the residual vibration of the piezoelectric transducer 1 has been suppressed. The aforementioned energy harvesting device uses super (ultra) capacitors which are not provided with the properties mentioned above.

Referring to FIG. 1 and FIG. 3, the piezoelectric transducer 1 is applied in a system (not shown) with an equivalent mass block (not shown). A single-mode governing equation is illustrated below:

$$M\ddot{u}+D\dot{u}+Ku=f-nv_p, \qquad \text{Equation 1}$$

in which, u represents displacement of the equivalent mass block, M represents mass of the equivalent mass block, D represents mechanical damping of the system, K represents stiffness of the system, f represents an external force applied to the equivalent mass block, n represents electro-mechanical ratio of the system, and $v_p$ represents the voltage on the piezoelectric transducer 1.

In a short-circuit condition (i.e., $v_p$=0), dynamics of the piezoelectric transducer 1 in the frequency domain satisfy the following equation:

$$\frac{u}{f}\bigg|_{short} = \frac{1}{K-M\omega^2+jD\omega}, \qquad \text{Equation 2}$$

$$\omega_r = \sqrt{\frac{K}{M}}, \qquad \text{Equation 3}$$

$$U_M^{short} = \frac{F_M}{D\omega}, \qquad \text{Equation 4}$$

in which, $\omega$ represents angular frequency, $\omega_r$ represents resonant angular frequency, $U_M^{short}$ represents amplitude of displacement of the piezoelectric transducer 1 at resonant frequency, and $F_M$ represents amplitude of an external force applied to the piezoelectric transducer 1 at resonant frequency.

Under the non-working mode, the voltage on the piezoelectric transducer 1 is determined by the capacitive energy storage component 33 and the switch unit 34. According to Fourier Theorem, the first-order harmonic voltage on the piezoelectric transducer 1 satisfies the following equation:

$$v_p = \frac{4}{\pi}V_{DC}\sin(\pi d)signe(\dot{x}), \qquad \text{Equation 5}$$

in which, $V_{DC}$ represents the voltage on the capacitive energy storage component 33, d represents a duty cycle of the first to fourth switches 341 to 344, and signe($\dot{x}$) is a signal function representing current variation of the piezoelectric transducer 1.

Substituting $v_p$ in Equation 5 for that in Equation 1, the dynamics of the piezoelectric transducer 1 in the frequency domain satisfy the following equations:

$$(K-M\omega^2)u + jD\omega u = f - jn\frac{4}{\pi}V_{DC}\sin(\pi d), \qquad \text{Equation 6}$$

$$U_M = \frac{F_M - n\frac{4}{\pi}V_{DC}\sin(\pi d)}{D\omega}, \qquad \text{Equation 7}$$

in which, $U_M$ represents amplitude of displacement of the piezoelectric transducer 1 in the frequency domain.

Comparing Equation 7 with Equation 4, theoretical attenuation of displacement of the piezoelectric transducer 1 satisfies the following equation:

$$A = 20\log_{10}\left(1 - n\frac{4}{\pi}\frac{V_{DC}}{F_M}\sin(\pi d)\right), \qquad \text{Equation 8}$$

According to Equation 8, residual vibration of the piezoelectric transducer 1 may be suppressed when the following Inequality 9 is satisfied. Otherwise, residual vibration thereof may be actuated.

$$V_{DC} \le \frac{\pi}{4n}\frac{F_M}{\sin(\pi d)}, \qquad \text{Inequality 9}$$

Since the voltage on the capacitive energy storage component 33 substantially tracks the voltage on the piezoelectric transducer 1 under the non-working mode which varies due to amplitude variations of the residual vibration thereof, a maximum value of the voltage on the capacitive energy storage component 33 preferably satisfies Inequality 9, and the closer the voltage thereof is to an upper limit of Inequality 9, the better effect of suppression the control device has. Moreover, the capacitance value of the capacitive energy storage component 33 may be calculated according to the following equation:

$$V_{DC} = \frac{1}{C}\int I(t)dt,\qquad \text{Equation 10}$$

in which, C represents the capacitance value of the capacitive energy storage component 33, and I(t) represents electric current of the capacitive energy storage component 33.

Preferably, the capacitance value of the capacitive energy storage component 33 is not greater than one-tenth of a capacitance value of a static capacitor in an equivalent circuit of the piezoelectric transducer 1. Preferably, the capacitance value of the capacitive energy storage component 33 ranges from 1 pF to 10 µF.

For example, when the preferred embodiment is applied for suppression of residual vibration of a piezoelectric transducer in a cantilever beam system, scale of the capacitance value of the capacitive energy storage component 33 is about µF level, but should not be limited thereto. The capacitance value thereof is determined according to parameters in the cantilever beam system and dimensions of the piezoelectric transducer.

Figure 2:
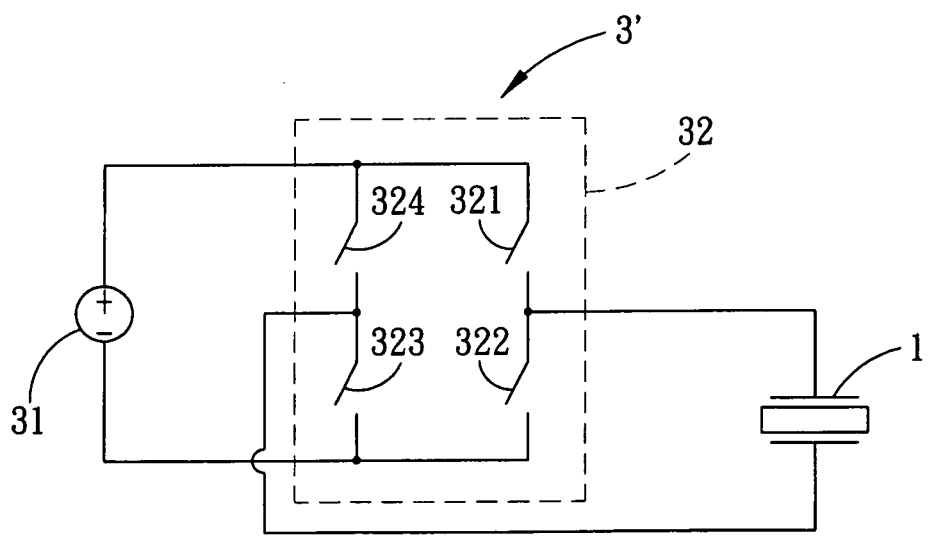
FIG. 2 is a circuit diagram illustrating a conventional residual control circuit applied in the control device in FIG. 1.

Referring to FIG. 2 and FIG. 3, comparing with the conventional residual control device 3', the residual control circuit 3 of the preferred embodiment uses the capacitive energy storage component 33 which has small capacitance to replace the direct current power source 31. When amplitude of residual vibration of the piezoelectric transducer 1 has been reduced to a low level, the voltage on the capacitive energy storage component 33 is also reduced to a low level. Therefore, energy of the capacitive energy storage component 33 may not disturb convergence of vibration of the piezoelectric transducer 1 through the switch unit 34, such that convergence of the residual vibration of the piezoelectric transducer 1 may be ensured.

Figure 6:
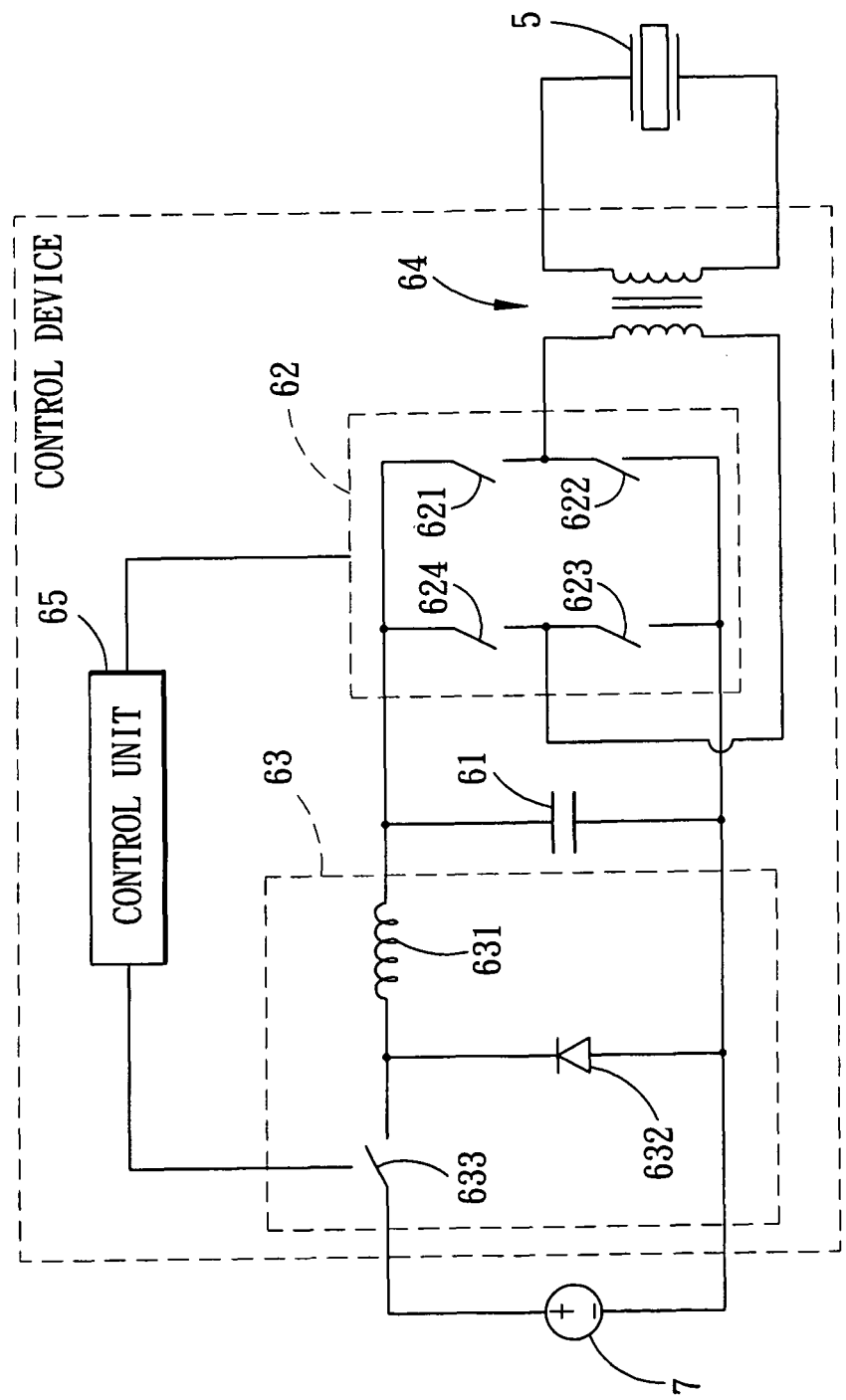
FIG. 6 is a circuit diagram illustrating a second preferred embodiment of the control device for suppression of residual vibration of a piezoelectric transducer of the present invention.

Referring to FIG. 6, a second preferred embodiment of a control device for suppression of residual vibration of a piezoelectric transducer 5 of the present invention includes a capacitive energy storage component 61, a switch unit 62, a power supply control unit 63, a voltage transformer 64, and a control unit 65.

The piezoelectric transducer 5 has a first component end and a second component end. The capacitive energy storage component 61 has a third component end and a fourth component end. In this embodiment, the capacitive energy storage component 61 is a capacitor. The switch unit 62 includes a first switch 621 connected between the first and third component ends, a second switch 622 connected between the first and fourth component ends, a third switch 623 connected between the second and fourth component ends, and a fourth switch 624 connected between the second and third component ends. The power supply control unit 63 includes an inductor 631, a diode 632, and a power control switch 633. The inductor 631 has a fifth component end coupled electrically to the third component end, and a sixth component end. The diode 632 has an anode coupled electrically to the fourth component end, and a cathode coupled electrically to the sixth component end. The anode is further coupled electrically to a negative terminal of an external direct current power source 7. The power control switch 633 is coupled electrically between the sixth component end and a positive terminal of the external direct current power source 7. The voltage transformer 64 is coupled electrically between the switch unit 62 and the piezoelectric transducer 5. The control unit 65 is coupled electrically to the switch unit 62 and the power supply control unit 63.

Figure 7:
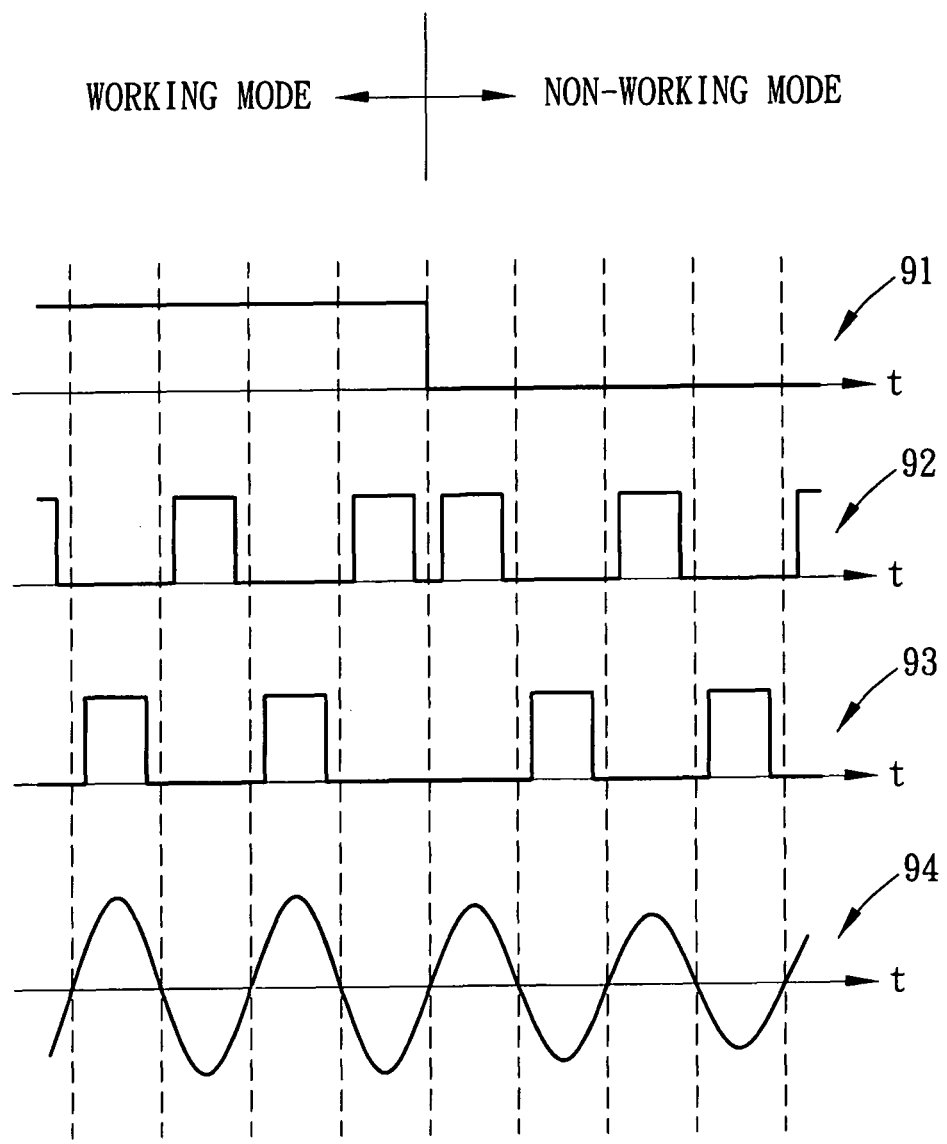
FIG. 7 is a waveform plot illustrating an electric current of the piezoelectric transducer and states of a power supply control unit and a switch unit of the second preferred embodiment.

Referring to FIG. 6 and FIG. 7, in FIG. 7, a waveform 91 illustrates a state of the power control switch 633, a waveform 92 illustrates states of the first and third switches 621, 623, a waveform 93 illustrates states of the second and fourth switches 622, 624, and a waveform 94 illustrates an electric current of the piezoelectric transducer 5. In the waveforms 91 to 93, a high level represents a conducting state, and a low level represents a non-conducting state. The control device is operable in a working mode and a non-working mode. Under the working mode, the control unit 65 controls the switch unit 62 and power supply control unit 63, such that the power control switch 633 conducts, that the first and second switches 621, 622 conduct alternately, that the third and fourth switches 623, 624 conduct alternately, and that the first and third switches 621, 623 conduct simultaneously. Accordingly, the power supply control unit 63 permits supply of a direct current voltage to the capacitive energy storage component 61 (i.e., the capacitive energy storage component 61 being charged thereby), and the switch unit 62 outputs a driving signal that has amplitude equivalent to a voltage on the capacitive energy storage component 61. The driving signal is amplified by the voltage transformer 64 for driving the piezoelectric transducer 5 to vibrate. When the first and third switches 621, 623 conduct, current flow through the piezoelectric transducer 5 is negative (i.e., from the second component end toward the first component end). When the second and fourth switches 622, 624 conduct, current flow through the piezoelectric transducer 5 is positive (i.e., from the first component end toward the second component end).

Under the non-working mode, the control unit 65 controls the switch unit 62 and power supply control unit 63, such that the power control switch 633 does not conduct, that the first and second switches 621, 622 conduct alternately, that the third and fourth switches 623, 624 conduct alternately, and that the first and third switches 621, 623 conduct simultaneously. Furthermore, conduction angles of each of the first and second switches 621, 622 when under the non-working mode are substantially 180 degrees out of phase with respect to conduction angles of each of the first and second switches 621, 622 when under the working mode. Therefore, the power supply control unit 63 ceases supply of the direct current voltage to the capacitive energy storage component 61 (i.e., the capacitive energy storage component 61 is no longer being charged thereby). Under the non-working mode, when the first and third switches 621, 623 conduct, the capacitive energy storage component 61 provides an equivalent positive voltage for the voltage transformer 64 through the switch unit (at this moment, current flow through the piezoelectric transducer 5 is positive). When the second and fourth switches 622, 624 conduct, the capacitive energy storage component 61 provides an equivalent negative voltage for the voltage transformer 64 through the switch unit 62 (at this moment, current flow through the piezoelectric transducer 5 is negative). The voltage transformer 64 amplifies voltage on the capacitive energy storage component 61 and provides the amplified voltage to the piezoelectric transducer 5 for suppression of residual vibration of the same.

In this embodiment, the voltage transformer 64 may be omitted. In this condition, the first component end is coupled electrically to each of the first and second switches 621, 622 directly, and the second component end is coupled electrically to each of the third and fourth switches 623, 624 directly.

Figure 8:
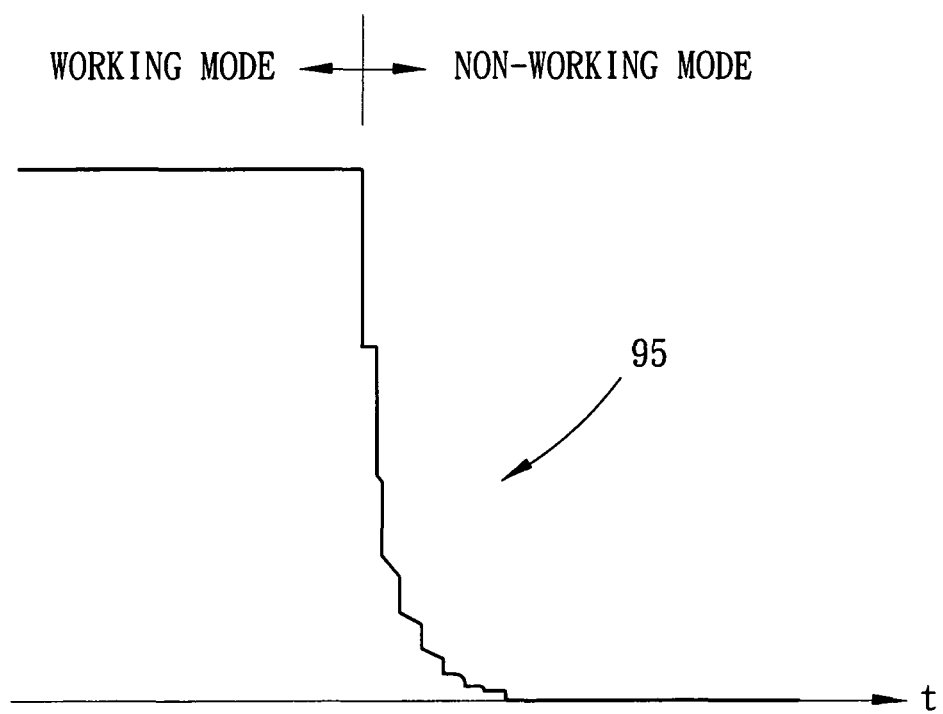
FIG. 8 is a waveform plot illustrating voltage on a capacitive energy storage component of the second preferred embodiment.

Referring to FIG. 6 and FIG. 8, a waveform 95 illustrates the voltage on the capacitive energy storage component 61. The capacitive energy storage component has a capacitance value that is sufficient for enabling the capacitive energy storage component 61 to be pre-charged under the working mode, and for enabling the voltage on the capacitive energy storage component to substantially track the voltage on the piezoelectric transducer 5 under the non-working mode since the piezoelectric transducer 5 is charged by the capacitive energy storage component 61. Furthermore, the voltage on the capacitive energy storage component 61 is substantially reduced to zero after the residual vibration of the piezoelectric transducer 5 has been suppressed. In this way, convergence of vibration of the piezoelectric transducer 5 may be prevented from being disturbed.

Since the voltage on the capacitive energy storage component 61 substantially tracks the voltage on the piezoelectric transducer 5 under the non-working mode, which varies due to amplitude variations of the residual vibration thereof, a maximum value of the voltage on the capacitive energy storage component 61 preferably satisfies Inequality 9, and the closer the voltage thereof is to an upper limit of Inequality 9, the better effect of suppression the control device has. Moreover, the capacitance value of the capacitive energy storage component 61 may be calculated according to Equation 10. Preferably, the capacitance value of the capacitive energy storage component 61 is not greater than one-tenth of a capacitance value of a static capacitor in an equivalent circuit of the piezoelectric transducer 5. Preferably, the capacitance value of the capacitive energy storage component 61 ranges from 1 pF to 10 μF While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A control device for suppression of residual vibration of a piezoelectric transducer, the piezoelectric transducer being applied in a system with an equivalent mass block, said control device comprising:
   a capacitive energy storage component; and
   a switch unit coupled electrically to said capacitive energy storage component, and for coupling electrically to the piezoelectric transducer;
   wherein when said control device is operating in a non-working mode, said switch unit provides voltage on said capacitive energy storage component to the piezoelectric transducer for reducing the residual vibration of the piezoelectric component;
   wherein said capacitive energy storage component has a capacitance value that is large enough to make the voltage on said capacitive energy storage component to substantially follow the voltage on the piezoelectric transducer while the control device operates under the non-working mode;
   wherein the voltage on said capacitive energy storage component under the non-working mode satisfies the following inequality:

$$V_{DC} \leq \frac{\pi}{4n} \frac{F_M}{\sin(\pi d)},$$

in which $V_{DC}$ represents the voltage on said capacitive energy storage component, n represents electro-mechanical ratio of the system, $F_M$ represents amplitude of an external force applied to the equivalent mass block at a resonant frequency, and d represents a duty cycle of said switch unit.

2. The control device as claimed in claim 1, the piezoelectric transducer having a first component end and a second component end, wherein:
   said capacitive energy storage component has a third component end and a fourth component end;
   said switch unit includes a first switch connected between said first and third component ends, a second switch connected between said first and fourth component ends, a third switch connected between said second and fourth component ends, and a fourth switch connected between said second and third component ends;
   said switch unit operates such that said first and second switches conduct alternately, that said third and fourth switches conduct alternately, and that said first and third switches conduct simultaneously.

3. The control device as claimed in claim 2, wherein, under the non-working mode, said switch unit further enables said capacitive energy storage component to be charged by energy released by the piezoelectric transducer.

4. The control device as claimed in claim 3, further comprising:
   a diode coupled electrically between said capacitive energy storage component and each of said first and fourth switches; and
   a resistor connected in parallel with said capacitive energy storage component.

5. The control device as claimed in claim 4, further comprising an inductor to be coupled electrically between the piezoelectric transducer and each of said first and second switches.

6. The control device as claimed in claim 5, further comprising:
   a current sensor to be coupled electrically between said inductor and the piezoelectric transducer for detecting direction of current flow through the piezoelectric transducer; and
   a control unit coupled electrically to said switch unit and said current sensor;
   said control unit being operable in the non-working mode to control said first and third switches to conduct when said current sensor detects current flows through the piezoelectric transducer from the first component end toward the second component end, and to control said second and fourth switches to conduct when said current sensor detects current flows through the piezoelectric transducer from the second component end toward the first component end.

7. The control device as claimed in claim 6, wherein, under the non-working mode, said second switch conducts a predetermined time interval after said first switch has stopped conducting and said third switch conducts a predetermined time interval after said second switch has stopped conducting to enable said inductor to release energy for charging the piezoelectric transducer.

8. The control device as claimed in claim 2, further comprising a power supply control unit coupled electrically to said capacitive energy storage component;
   said control device is further operable in a working mode, in which said power supply control unit permits supply of a direct current voltage to said capacitive energy storage component, and in which said switch unit outputs a driving signal for driving the piezoelectric transducer to vibrate;

said power supply control unit terminates supply of the direct current voltage to said capacitive energy storage component under the non-working mode; and conduction angles of each of said first and second switches when under the non-working mode are substantially 180 degrees out of phase with respect to conduction angles of each of said first and second switches when under the working mode.

9. The control device as claimed in claim 8, wherein said power supply control unit includes:
   an inductor having a fifth component end coupled electrically to said third component end, and a sixth component end;
   a diode having an anode coupled electrically to said fourth component end, and a cathode coupled electrically to said sixth component end, said anode to be further coupled electrically to a negative terminal of an external direct current power source; and
   a power control switch coupled electrically between said sixth component end and a positive terminal of the external direct current power source;
   wherein said power control switch conducts when under the working mode for permitting energy from the external direct current power source to be received by said capacitive energy storage component via said inductor; and
   wherein said power control switch ceases conducting when under the non-working mode for disconnecting said capacitive energy storage component from the external direct current power source.

10. The control device as claimed in claim 9, further comprising a voltage transformer to be coupled electrically between said switch unit and the piezoelectric transducer for amplifying signals outputted from said switch unit, and for supplying the piezoelectric transducer with the signals amplified thereby.

11. The control device as claimed in claim 1, wherein the capacitance value of said capacitive energy storage component is not greater than one-tenth of a capacitance value of a static capacitor in an equivalent circuit of the piezoelectric transducer.

12. The control device as claimed in claim 1, wherein the capacitance value of said capacitive energy storage component ranges from 1 pF to 10 µF.

* * * * *